Figure 3:
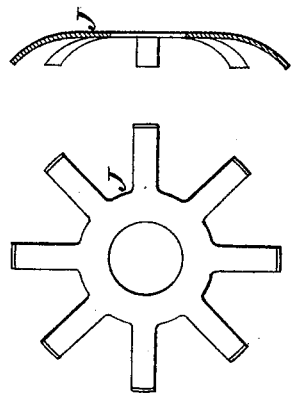

(No Model.) 2 Sheets—Sheet 1.

G. STUART.
MECHANISM FOR ADJUSTING AND RETAINING ORDNANCE SIGHTS.

No. 371,286. Patented Oct. 11, 1887.

Witnesses
Edward C. Davidson
Baltus D. Long

Inventor
G. Stuart
By attys (No Model.) 2 Sheets—Sheet 2.

G. STUART.

MECHANISM FOR ADJUSTING AND RETAINING ORDNANCE SIGHTS.

No. 371,286. Patented Oct. 11, 1887.

Fig.⁸ 8.

United States Patent Office.

GEORGE STUART, OF NEWCASTLE-UPON-TYNE, ENGLAND, ASSIGNOR TO W. G. ARMSTRONG, MITCHELL & CO., (LIMITED,) OF SAME PLACE.

MECHANISM FOR ADJUSTING AND RETAINING ORDNANCE-SIGHTS.

SPECIFICATION forming part of Letters Patent No. 371,286, dated October 11, 1887.

Application filed May 31, 1887. Serial No. 239,862. (No model.)

*To all whom it may concern:*

Be it known that I, GEORGE STUART, a subject of the Queen of Great Britain, residing at the Elswick Works, Newcastle-upon-Tyne, England, engineer, have invented certain new and useful Improvements in Mechanism for Adjusting and Retaining Ordnance-Sights, of which the following is a specification.

The object of the invention is to securely retain the sight-bar at any elevation to which it may have been moved, and yet allow of its being moved with ease and smoothness either upward or downward. The bar is, as usual, capable of being moved upward or downward through a guiding-slot formed through a fixed support, and is raised or lowered by turning a toothed pinion, which gears with rack-teeth cut upon it, and the pinion and the greater part of its spindle are inclosed within a tube forming part of the fixed support. The spindle also, by collars upon it, is prevented from moving endwise in this tubular casing.

To retain the sight-bar at any elevation to which it may be moved, I, according to my invention, fix onto the end of the tubular casing a ring having concentric with and projecting from its outer face a coned friction-surface. The spindle is made to project outward beyond this end of the casing and through the center of the cone on its outer face, and has mounted loosely upon it another friction-cone, which, by being slid along the spindle, can be made to engage with the fixed friction-cone above mentioned, but cannot be turned without turning the spindle with it. Normally the friction-cone on the spindle is held by a spring up to and against the fixed cone, and the spindle is so locked and retained from turning, and the sight-bar retained in any position into which it may have been moved. The spring is preferably a dished spring interposed between the friction-cone on the spindle and a milled head, which is mounted loosely on the spindle and which abuts against a nut screwed onto its end. Whenever the sight is to be raised or lowered, the milled head is turned in one direction or the other, and as it is turned it is first caused to draw back the friction-cone on the spindle away from the fixed friction-cone and then to turn the spindle. Two ways of effecting this are shown in the drawings hereunto annexed.

Figure 6:
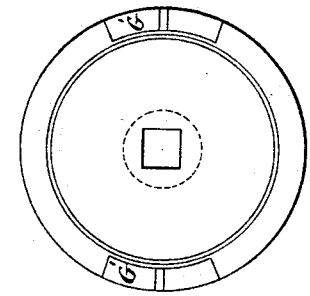
Figure 2:
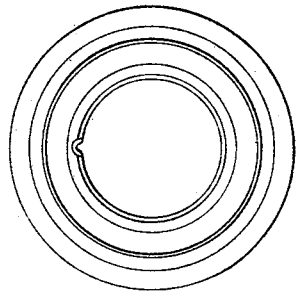
Figure 4:
Figure 5:
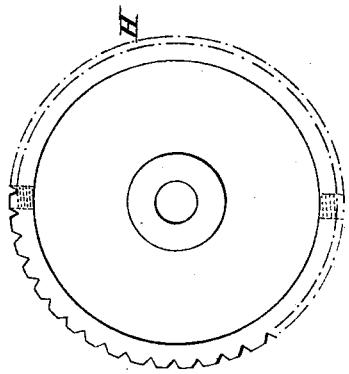
Figure 1:
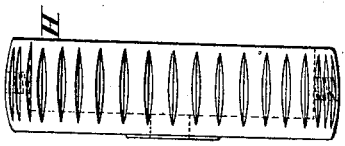
Figure 1:
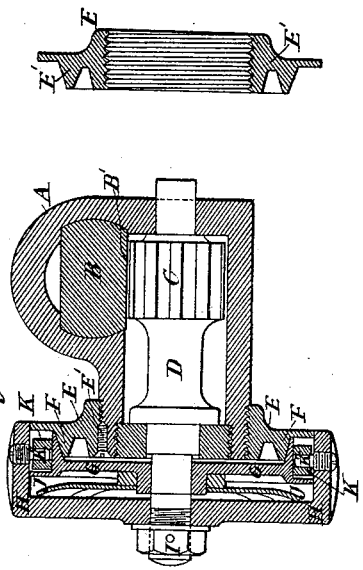
Figure 7:
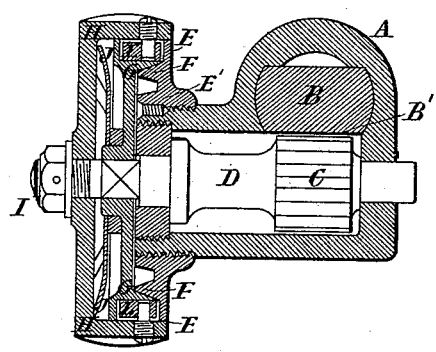
Figure 7:
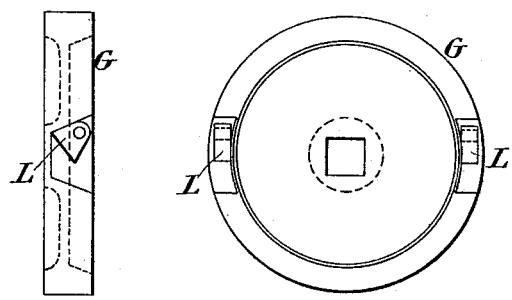

Figure 1 is a horizontal cross-section of one form of the mechanism. Figs. 2, 3, 4, 5, and 6 show views of some of the parts of this mechanism. Figs. 2 are a cross-section and face view of the ring E; Figs. 3, a cross-section and face view of the spring J; Figs. 4, an end and side view of the spindle D; Figs. 5, an edge and face view of the milled head H; Figs. 6, an edge and face view of the loose friction-cone G. Fig. 7 is a horizontal cross-section of a modified form of the mechanism, and Figs. 8 an edge and face view of the loose friction-cone G of this modified form.

In Figs. 1 to 6, A is a gun-metal clamp or holder of the form ordinarily used for carrying the sight-bar.

B is the sight-bar, which can be moved upward or downward through the clamp, and which has a toothed rack on its face, B'. C is a toothed pinion gearing into this rack. One end of the spindle D of this pinion passes out from the clamp or holder A through a screw-ring, which closes the end of the tubular portion of the clamp within which the pinion is contained. Collars on the spindle prevent it from moving endwise, as shown.

E is a steel ring screwed onto the exterior of the tubular portion of the clamp and locked by a small screw-pin, E'.

F is a conical projection on the outer face of the ring.

G is a disk, preferably of manganese bronze. It has a conical recess in it corresponding to the cone F, and it can slide endwise along a square portion of the spindle D.

H is a hollow milled head loose on the spindle.

I is a nut screwed onto the end of the spindle and bearing against the milled head.

J is a spring interposed between the milled head and sliding coned disk G. G' G' (see Fig. 6) are two notched recesses formed in the outer circumference of this disk.

K K are two small rollers lying in the recesses and turning upon pins K', screwed into the circumference of the milled head, as shown at Fig. 1.

The bottom of each recess G' is, as shown at Fig. 6, formed of two inclines meeting at the center. Normally the rollers K are in the center of the recesses, and the conical recess in the disk G is, by the action of the spring J, forced against the fixed cone F, and the spindle is consequently locked and prevented from rotating. If, however, the milled head E be turned in either direction, the rollers K, acting upon the inclined bottom of the recesses G', force the coned disk G backward against the spring J and release this coned disk from the fixed cone F, so that when the rollers come against the end of the recesses the spindle can be turned freely with the milled head and the sight-bar so raised or lowered according as the milled head is turned in one direction or the other.

In the modification shown at Fig. 7 small triangular levers L are substituted for the rollers K on the pins K', and the recesses G' are made of the form shown at Figs. 8. The base of each lever is in contiguity with the bottom of the recess G', in which it lies. When the milled head is turned in one or other direction, one of the angles of the base of the lever will first be brought against one or other end of the recess in which the lever lies, and the lever will then turn on its fulcrum and its angle will be thrust against the bottom of the recess and will thereby thrust the friction-cone G on the spindle away from the fixed cone. When the side of the triangle comes against the end of the recess, the friction-cone will be turned and will turn the spindle with it.

The ends of each recess are, as shown, made inclined, so that when a side of the lever is resting against either of them the lever has been brought into such a position that the spring J has little or no tendency to turn the lever, and so has little or no power to thrust the friction-cone forward so that the milled head may be turned with ease.

Having now particularly described and ascertained the nature of my said invention and in what manner the same is to be performed, I declare that what I claim is—

1. The combination, with the holder A, sight-bar B, and pinion C, fixed on spindle D and gearing with rack on sight-bar, of the fixed cone F, cone G, sliding along spindle D, milled head H, spring J, to press loose cone G up to and against the fixed cone F, and mechanism for first drawing back the loose cone to disengage it from the fixed cone, and then turning the spindle whenever the milled head is turned in one direction or the other.

2. The combination, with the holder A, sight-bar B, and pinion C, fixed on spindle D and gearing with rack on sight-bar, of the fixed cone F, cone G, sliding along spindle D, milled head H, spring J, recesses G', and triangular levers L, lying in the recesses and carried by the milled head H, substantially as described.

G. STUART.

Witnesses:
WM. JOHN GREY,
T. PURVIS.